United States Patent Office 3,511,574
Patented May 12, 1970

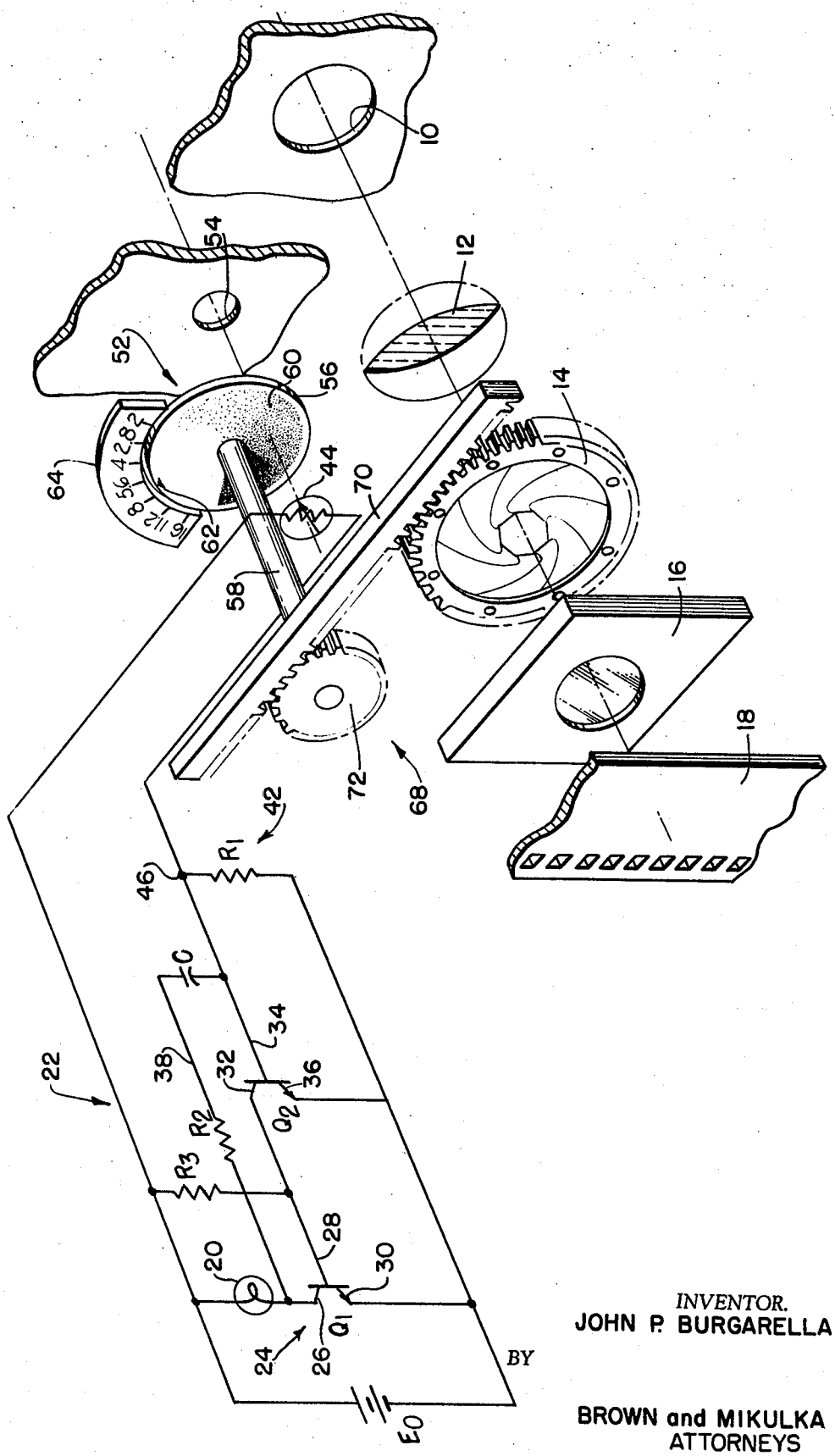

3,511,574
PHOTOMETRIC APPARATUS HAVING AN INTERMITTENT SIGNAL AT A SELECT OUTPUT STATE
John P. Burgarella, Sudbury, Mass., assignor to Polaroid Corporation, Cambridge, Mass., a corporation of Delaware
Filed Dec. 27, 1965, Ser. No. 516,241
Int. Cl. G01j 1/00; 1/42, 1/44
U.S. Cl. 356—226                    5 Claims

ABSTRACT OF THE DISCLOSURE

A photometer having three perceptible output states. A light responsive transistorized control circuit intermittently activates a lamp upon selection of an appropriate exposure factor value. The lamp is steadily energized for selections on one side of this value and de-energized for selections on an opposite side of that value.

---

This invention relates to photometric apparatus for indicating the selection of a photmetric value corresponding to the brightness of a measured field of illumination. More particularly, this invention concerns photometric apparatus useful for indicating when an appropriate photographic exposure factor value has been selected.

Many types of apparatus have been designed for measuring the brightness of a given light source or field of illumination. Each type has had certain qualities, but also had certain other characteristics which impair its overall performance and usefulness. For example, photometric devices of the galvanometer type are accurate but are apt to be inconveniently delicate. In addition, they require that the operator divert attention from the field of illumination to the meter to take a brightness level reading.

In certain photographic applications, the photographer often must act quickly, as where the scene involves action. In these situations, the necessity of diverting attention from the scene to the meter to take a reading and then making the necessary conversion of the reading into exposure settings on the camera can be quite bothersome.

It would be desirable, then, to provide photometric apparatus which would, by a unique positive signal, indicate the selection of a photometric value corresponding to the brightness of a measured field of illumination. In photographic applications, the apparatus would signal the selection of an exposure factor value within a narrow range of values appropriate for the scene brightness and the photosensitive materials employed.

Certain prior art photometric devices include signaling arrangements wherein the signal means is activated above a signal condition, herein defined as the condition obtaining when a photometric value has been selected which corresponds to the brightness of a measured field of illumination. In these devices the signal means is deactivated below the signal condition. With such prior art arrangements, the signal condition isactually a non-existent state between the "signal on" and "signal off" states. Thus, the activation of the signal means indicates that the selected photometric value is either too great or too small, and likewise, a deactivation of the signal means indicates the selection of a photometric value which is inappropriate in the opposite sense.

The signal provided should be positve or active rather than negative or passive, the former being more readily perceived by the operator. In addition, since the absence of an indicating signal cannot be distinguished from an inoperative state of a measuring and indicating instrument, the utilization of a positive signal provides a "fail-safe" feature which enables the opeartor to ascertain with certitude that the indication given may be relied upon.

The apparatus should not only yield a positive signal when an appropriate photometric value or exposure factor value has been selected, but preferably, should also indicate whether a selected value which is not appropriate is greater than or less than the range of appropriate values in order that the operator may more easily and quickly find the range of appropriate values.

Accordingly, it is the primary object of this invention to provide photometric apparatus having three perceptible output states, of which one state provides a predetermined positive signal indicating the selection of a unique photometric value corresponding to the brightness of a measured field of illumination.

It is another object of this invention to provide photographic photometric apparatus which utilizes a signal means and a light-responsive, transistorized control circuit for the signal means to provide a positive intermittent signal indicating the selection of an exposure factor value appropriate for the scene brightness and the photosensitive materials employed.

It is a further object of this invention to provide photographic photometric apparatus which yields a predetermined positive signal when an appropriate exposure factor value has been selected, and which also distinctly indicates whether a selected exposure factor value which is not appropriate is greater than or less than an appropriate value.

Briefly, the subject invention concerns photometric apparatus useful for photographic purposes and having three distinct output states, a predetermined one of these states indicating at a particular signal condition the selection of a photometric value within a narrow range of appropriate or correct values. The other two output states are distinct from each other and from the predetermined output state and signal whether the selected photometric value is greater than or less than the range of appropriate values. Thus the apparatus indicates the direction in which adjustment should be made to seek an appropriate or correct photometric value. Apparatus implementing the inventive concept may include electrical signal means such as a lamp, semiconductor switching means for controlling the energization of the lamp, and a voltage-dividing network providing bias control for the switching means, the network including a photoconductive element exposed to light from the scene to be photographed. The semiconductor switching means and a feedback means are constructed and arranged such that the switching means will effect an intermittent energization of the lamp at the signal condition. The division of voltage on the voltage-dividing network is made selectively variable, as by means of a graded density filter movably mounted in front of the photoconductive element to control the scene light admitted to the photoconductive element and thus the resistance of the element. With the circuit parameters properly selected and all components of the apparatus properly calibrated, the signal means will be intermittently energized only at the signal condition representing that a photometric value within a narrow range of appropriate values has been selected. The signal means is energized to produce a constant output when an incorrect photometric value has been selected indicating, for example, that the selected value would result in under-exposure of photosensitive materials employed in a given photographic situation. The signal means is deactivated, on the other hand, when the selected photometric value represents an opposite extreme which might result in overexposure of the photosensitive materials. Thus, the novel photometric apparatus provides an intermittent signal only at the correct signal condition and in addition has two distinct output states to indicate the direction in which to search for an appropriate value when an inappropriate value has been selected.

Other objects of this invention will in part be obvious and will in part appear hereinafter.

The invention accordingly comprises the apparatus possessing the construction, combination of elements, and arrangement of parts which are exemplified in the following detailed disclosure, and the scope of the application of which is indicated in the claims.

For an understanding of the nature and objects of the invention reference should be had to the following detailed description taken in connection with the accompanying drawing, wherein:

The single figure schematically illustrates one embodiment of the invention.

Referring to the drawing, one possible structural implementation of applicant's inventive concept is diagrammatically shown. The novel photometric apparatus is shown in the drawing figure as being adapted for use in a camera including an exposure aperture 10, an objective lens 12, a variable diaphragm 14, a fixed-speed shutter mechanism 16, and a sheet 18 of photosensitive material.

In order to provide a clearly perceptible signal at a signal condition wherein an appropriate exposure factor value for the scene brightness and the photosensitive materials employed has been selected, the subject apparatus includes a lamp 20. A control circuit having two stable and unstable output states is provided for controlling the activation of the lamp 20. The circuit includes semiconductor switching means 24 comprising an NPN transistor $Q_1$ having collector, base, and emitter electrodes, 26, 28, and 30, respectively, and a second NPN transistor $Q_2$ having collector, base, and emitter electrodes, 32, 34 and 36, respectively. A source $E_0$ of supply voltage is connected across the lamp 20 and transistor $Q_1$. The lamp 20 is connected in the collector circuit of transistor $Q_1$ so that the lamp 20 will be activated by the voltage source $E_0$ when the transistor $Q_1$ is turned on. Resistor $R_3$ is a bias resistor providing a base bias current of appropriate magnitude for transistor $Q_1$. Transistor $Q_2$ has its collector electrode 32 connected directly to the base electrode 28 of transistor $Q_1$. In order that the switching means 24 can effect on intermittent energization of the lamp 20 at the signal condition, a feedback circuit 38 is provided. The feedback circuit 38 is connected between the collector electrode 26 of transistor $Q_1$ and the base electrode 34 of transistor $Q_2$ and includes a resistor $R_2$ and a capacitor C.

In order that a variable control voltage may be developed on the base electrode 34 of transistor $Q_2$, a voltage-dividing network 42 is provided. The voltage-dividing network 42 comprises a resistor $R_1$ and a photoconductive element 44 connected at a terminal 46. The element 44 is exposed to scene light through an opening 48 in a front wall 50 of a housing for the apparatus.

So that the division of voltage on the voltage-dividing network 42, and hence the voltage appearing at a terminal 46, may be selectively adjusted, a variable light-attenuating means 52 is provided. The light-attenuating means 52 is disposed between the photoconductive element 44 and the opening 48 through which light from the scene is admitted to the photoconductive element 44.

The light-attenuating means 52 comprises, in the embodiment illustrated, a disc 56 rotatably mounted on a shaft 58. The disc 56 incorporates a graded density filter 60. The disc 56 is manually rotatable and may have an index mark 62 thereon which may be used in conjunction with appropriate indicia 64 to indicate the selected exposure factor value. Each setting of the disc 56 corresponds to a level of scene brightness; hence the indicia 64 might be used to represent a range of exposure values, shutter speeds, foot candles, or any other scale each value of which corresponds to a particular brightness of a measured field of illumination. In the illustrated embodiment, which assumes a fixed shutter speed and film speed, the indicia 64 is shown as indicating a range of $f$-numbers.

The novel photometric apparatus may be operated as a separate instrument, or, as illustrated in the drawing, the apparatus may be coupled directly to one or more elements of the exposure control apparatus in a camera. In order to effectuate such a coupling, coupling means 68 are provided. The coupling means 68 comprises a rack 70 and a pinion 72 on shaft 58 translating angular movement of the disc 56 into a setting of the variable diaphragm 14. With such a coupling arrangement to automatically set the variable diaphragm 14, the illustrated indicia 64 (a range of $f$-numbers) would be useful in determining the depth of field at a given level of scene brightness.

The operation of the embodiment illustrated in the drawing is as follows. As the disc 56 is rotated in search of an appropriate relative aperture value, the amount of scene light admitted through the opening 54 and the filter 60 to the photoconductive element 44 changes. Hence, the resistance of the photoconductive element 44 also varies. If relative aperture values are selected by means of disc 56 which would cause the photosensitive materials used to be underexposed, the disc 56 will be positioned such that the filter 60 blocks too much light from the photoconductive element 44. At these settings the resistance of element 44 will be less than a predetermined value which it assumes at the signal condition wherein an appropriate exposure factor value has been selected. Assuming a proper selection of all circuit components, particularly the value of $R_1$, a voltage will be developed on the voltage-dividing network 42 at terminal 46 which is insufficient to bias transistor $Q_2$ into conduction. Base bias current will flow into the base of transistor $Q_1$ through resistor $R_3$ which is sufficient to bias transistor $Q_1$ into conduction and to thus effect a stable activation of the lamp 20. Therefore, for all selected relative aperture values on this side of the signal condition, the lamp will produce a constant illumination to signal that if a photograph were taken at the selected relative aperture value, the photosensitive materials would be underexposed.

If relative aperture values are selected which would cause an overexposure of the photosensitive materials, the filter 60 will be positioned to allow an excessive amount of light to impinge on the photoconductive element 44, causing the resistance of the element 44 to be less than the predetermined value which the element 44 assumes at the signal condition. At such settings of disc 56 a voltage will be developed at terminal 46 on network 42 which is effective to trigger transistor $Q_2$ into full conduction. With transistor $Q_2$ turned fully on, a marked drop in the voltage on the base electrode 28 of transistor $Q_1$ will occur, causing transistor $Q_1$ to be turned off due to insufficient forward bias across the base and emitter electrodes 28, 30 thereof. Hence, at all selected relative aperture values which would cause an overexposure of the photosensitive materials, the lamp 20 will be deactivated to signal the operator to continue searching for an appropriate relative aperture value in the direction of numerically increased values.

Thus, the operator can easily find the range of appropriate relative aperture values by paying heed to the output of the lamp 20 while searching for the appropriate values. If the lamp 20 is producing a constant output, the operator is signaled to select a numerically smaller relative aperture value, and if the lamp 20 is deactivated the operator is signaled to select numerically relative larger aperture values.

At the signal condition the semiconductor switching means 24, comprising transistors $Q_1$ and $Q_2$, and the feedback circuit 38 will function so as to effect an intermittent activation of the lamp 20. At the signal condition the photoconductive element 44 has a predetermined resistance value such that a voltage is developed at terminal 46, and hence on the base 34 of transistor $Q_2$, which is sufficint to begin to turn transistor $Q_2$ on. As transistor $Q_2$ begins to conduct, the voltage on the base electrode 28 of transistor $Q_1$ begins to fall; thus causing transistor $Q_1$ to lose a portion of its forward bias. Hence, the conduction of transistor $Q_1$ begins to decrease, and the voltage at the collector electrode 26 of transistor $Q_1$ begins to rise toward the value of the supply voltage $E_0$. Feedback of current through the feedback circuit 38 to the base electrode 34 of transistor $Q_2$ causes an increase in the conduction of transistor $Q_2$. Hence a further decrease in the voltage at the base electrode 28 of $Q_1$ and a further decrease in the conduction of transistor $Q_1$ results. The regenerative feedback continues until the forward bias across the emitter and base electrodes 30, 26 of transistor $Q_1$ drops below the minimum necessary to maintain transistor $Q_1$ in conduction, causing the lamp 20 to be deactivated. However, during the period of regenerative feedback, capacitor C is charged, causing the feedback current through circuit 38 to decrease. Thus the conduction of transistor $Q_2$ will start to decrease toward its original level of conduction determined by the resistance of the photoconductive element 44. The decrease in the conduction of transistor $Q_2$ causes the voltage on the base electrode 28 of transistor $Q_1$ to rise to a level wherein transistor $Q_1$ again begins to conduct. As transistor $Q_1$ again begins to conduct, the voltage on the collector electrode 26 of transistor $Q_1$ starts to fall, causing capacitor C to discharge through transistor $Q_1$. The discharge of capacitor C quickly causes the base bias current for transistor $Q_2$ to drop below the minimum necessary to sustain transistor $Q_2$ and transistor $Q_2$ is completely turned off. After capacitor C has discharged sufficiently, transistor $Q_2$ will then begin to conduct again to start another cycle. The frequency of the cycle is determined by the RC time constant of C and $R_2$ in the feedback circuit 38. It is clear then that at the signal condition the lamp 20 will be intermittently activated, due to the unstable output of the control circuit, to yield a positive signal indicating to the operator that he has selected an appropriate exposure factor value for the existing light conditions and photosensitive materials used.

By this invention, then it is evident that apparatus is provided which yields a predetermined positive (intermittent) signal only when an exposure factor value within a narrow range of appropriate values has been selected. The selection of an inappropriate value on either side of the signal condition is indicated by either the constant activation of the lamp 20 or the complete deactivation thereof.

The above-described photometric apparatus is particularly suited for use with or incorporation in a camera; however, such apparatus could be used in other than photographic applications for indicating the selection of a photometric value corresponding to the brightness of any measured field of illumination.

Certain changes may be made in the above apparatus without departing from the scope of the invention herein involved. For example, a linearly movable filter of optical wedge or a diaphragm might be substituted for the illustrated disc 56 and filter 60. As an alternative to using a graded density filter as a means for varying the division of voltage on the voltage-dividing network 42, the filter 60 might be eliminated and a resistor $R_1$ replaced by a potentiometer. The potentiometer could be varied to control the apportionment of voltage on the voltage-dividing network 52 and, hence, the control voltage at terminal 46. The positions of the photoconductive element 44 and $R_1$ in the voltage-dividing network 42 could be reversed without destroying the operability of the apparatus. Any of a number of coupling arrangements would be satisfactory in place of the rack and pinion arrangement illustrated. Signal means other than a lamp could be employed. The means for selectively varying the division of voltage on the voltage-dividing network 42 might also be coupled to a variable speed shutter mechanism or conjointly to the shutter mechanism and the variable diaphragm.

It is therefore intended that all matter contained in the above description or shown in the accompanying drawing shall be interpreted as illustrative and not in a limiting sense.

What is claimed is:

1. Photographic photometric apparatus having at least one component for selecting various photometric value settings, and having three distinct output states, one state providing a positive intermittent signal at a signal condition indicatng the selecton of an exposure factor value within a narrow range of values corresponding to the brightness of a measured field of illumination, comprising:

signal means for generating a perceptible signal when energized;
   a source of electrical energy coupled for selectively energizing said signal means;
   switching network means coupled in switching relationship with said signal means and said source of energy for controlling the selective energization of said signal means;
   a photoconductive element exposed to the light from said field of illumination, said photoconductive element being coupled within said switching network, having an electrical parameter varying in accordance with the intensity of light incident thereon and operable to cause a corresponding variation in the operation of said switching network;
   adjustable means providing for the orientation of said at least one component of said apparatus for selecting various photomeric value settings; and
   means coupling said switching network and said adjustable means setting for causing said network to have an unstable output at said signal condition when the selected exposure factor value falls within said range of appropriate values and for causing said network to have a stable output on either side of said signal condition when the selected exposure factor value deviates from said range of appropriate values.

2. The invention defined by claim 1 in which said last mentioned means includes an oscillator feedback circuit.

3. The invention defined by claim 1 wherein said switching network means comprises:

a first transistor in series with said signal means, said first transistor having base, emitter, and collector electrodes,
   a second transistor connected in shunt across said base and emitter electrodes of said transistor, said second transistor having a base electrode, and
   feedback means from the collector electrode of said first transistor to said base of said second transistor, said feedback means including a capacitor.

4. The invention defined by claim 2 wherein said last mentioned means comprises variable light-attenuating means for selectively varying the scene light admitted to said photoconductive element and thus the resistance of said element.

5. The invention defined by claim 4 wherein said light-attenuating means comprises a graded density filter.

References Cited

FOREIGN PATENTS 997,047   6/1965   Great Britain.

RONALD L. WIBERT, Primary Examiner

W. A. SKLAR, Assistant Examiner

U.S. Cl. X.R.

356—227, 235; 95—10; 250—206, 229; 340—221, 228, 331